(12) United States Patent
Amthor et al.

(10) Patent No.: US 11,900,573 B2
(45) Date of Patent: Feb. 13, 2024

(54) METHOD AND DEVICE FOR GENERATING AN OVERVIEW CONTRAST IMAGE OF A SAMPLE CARRIER IN A MICROSCOPE

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 373 days.

(21) Appl. No.: 17/385,880

(22) Filed: Jul. 26, 2021

(65) Prior Publication Data

US 2022/0058782 A1 Feb. 24, 2022

(30) Foreign Application Priority Data

Aug. 20, 2020 (EP) .................................. 20191929

(51) Int. Cl.
*G06T 5/00* (2006.01)
*G06T 5/40* (2006.01)
*G06T 5/50* (2006.01)

(52) U.S. Cl.
CPC ............... *G06T 5/009* (2013.01); *G06T 5/40* (2013.01); *G06T 5/50* (2013.01); *G06T 2207/10056* (2013.01); *G06T 2207/10152* (2013.01)

(58) Field of Classification Search
CPC ............ G02B 21/367; G02B 21/06; G06T 2207/10056; G06T 2207/10152; G06T 5/50; H04N 23/671
See application file for complete search history.

(56) References Cited

U.S. PATENT DOCUMENTS

| | | | | |
|---|---|---|---|---|
| 8,743,158 | B2* | 6/2014 | Kang | ................. G09G 3/3413 |
| | | | | 345/690 |
| 11,676,366 | B1* | 6/2023 | Cooke | ............... G06F 18/23213 |
| | | | | 382/154 |
| 2018/0024346 | A1 | 1/2018 | Inomata et al. | |
| 2018/0330490 | A1* | 11/2018 | Kido | ..................... G06T 7/0004 |
| 2020/0088984 | A1* | 3/2020 | Haase | .................. G02B 21/367 |

FOREIGN PATENT DOCUMENTS

DE 102017111718 A1 12/2018

OTHER PUBLICATIONS

European Search Report for EP Application No. 20191929, dated Feb. 17, 2021.

* cited by examiner

*Primary Examiner* — Li Liu

(74) *Attorney, Agent, or Firm* — NIXON PEABODY LLP

(57) ABSTRACT

The invention relates to a method and device for generating an overview contrast image of a sample carrier in a microscope, which images a sample arranged on the sample carrier. The sample carrier on which the sample is located is illuminated in transmitted light from a two-dimensional illumination array, which has individually switchable single light sources and illuminates the sample volume in transmitted light, and a processing unit, which activates and reads out the camera in order to record multiple different raw overview images of the sample carrier.

14 Claims, 2 Drawing Sheets

Figure 1:
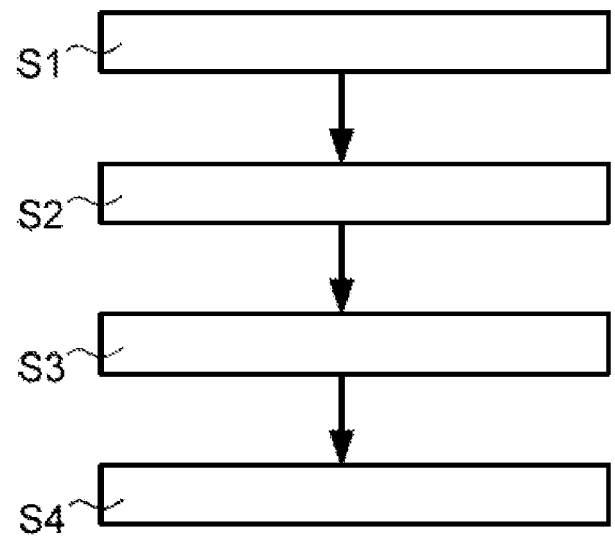

METHOD AND DEVICE FOR GENERATING AN OVERVIEW CONTRAST IMAGE OF A SAMPLE CARRIER IN A MICROSCOPE

The invention relates to a method for generating an overview contrast image of a sample carrier in a microscope, which images a sample arranged on the sample carrier. The sample carrier on which the sample is located is illuminated in transmitted light from a two-dimensional illumination array, which has individually switchable single light sources and illuminates the sample volume in transmitted light, and a processing unit, which activates and reads out the camera in order to record multiple different raw overview images of the sample carrier. Furthermore, the invention relates to a device for generating an overview contrast image of a sample carrier, which is to be arranged in a sample volume, in a microscope. The device has a camera, which has an image field acquiring the sample volume, a two-dimensional illumination array, which has individually switchable single light sources and illuminates the sample volume in transmitted light, and a processing unit, which activates and reads out the camera in order to record multiple different raw overview images of the sample carrier.

A method for generating and analyzing an overview contrast image is known from DE 2017 111 718 A1. At least two overview raw images are taken by different illuminations of the sample, which are combined to form an overview contrast image. The different illuminations are implemented here by a displacement of the sample laterally to the illumination pattern, chronologically differing illuminations, or illumination using different illumination patterns.

A device for observing a sample is known from U.S. Pat. No. 8,400,710 B2. Light and dark regions are defined by an illumination pattern. This enables an image to be transmitted by means of dark-field observation to a processing unit.

A method and a device are to be provided for generating an overview contrast image of a sample carrier in a microscope which images the sample.

The invention is defined in claim 1 and in claim 7. Advantageous refinements are specified in the dependent claims. The preferred embodiments apply in the same way to the method and the device.

A method and a device for generating an overview contrast image of a sample carrier in a microscope, which has a sample volume in which the sample carrier is arrangeable with the sample, and this microscope then images it, are provided. In a step a), the sample volume, i.e., the sample carrier generally arranged therein, on which the sample is located, is illuminated in transmitted light from a two-dimensional illumination array, which has individually switchable single light sources. For example, an LED array having a number N of single LEDs is used as a two-dimensional illumination array.

In a step b), multiple raw overview images of the sample carrier are recorded. In the device, this recording is carried out using a camera which acquires the sample volume and is connected to a processing unit via electrical lines, radio, or the like. All raw overview images are recorded using the same camera and preferably the same image recording parameters. The position of this camera remains the same over the recording of all raw overview images.

Each of the raw overview images is generated in that precisely one of the single light sources is switched on, wherein a different single light source is switched on for each raw overview image, so that N raw overview images are recorded. In the device, the processing unit is configured so that it activates and reads out the camera in order to record multiple different raw overview images. The processing unit activates the two-dimensional illumination array to switch on the single light sources individually. The processing unit is configured so that it generates each of the raw overview images in that it switches on precisely one of the single light sources, wherein it switches on an individual one of the single light sources for each raw overview image, so that it records N raw overview images.

The N raw overview images are thus obtained in that the single light sources are switched through in succession. However, not all single light sources have to be used. N can also be less than the number of the available single light sources. N preferably corresponds to the total number of the single light sources. The single light sources used can be switched through in series (thus from the first to the Nth single light source) or in any other sequence.

In the N raw overview images, in addition to structures of the sample, structures which are not to be associated with the sample and which would make it more difficult to find the sample in the raw overview image are located in the sample carrier arranged in the sample volume. These structures, which are not to be associated with the sample, are, for example, elements of the image recording process, for example the single light sources, or parts of the sample carrier, for example walls of vessels, etc. They would interfere in the overview contrast image.

Therefore, in a step c), intermediate images are generated which are then combined to form the overview contrast image. The intermediate images suppress the interference. The following procedure is used for generating the intermediate images: First the brightness ranges are defined in a specific number for the pixels of the raw overview images. Precisely one brightness rank is then assigned to each of the intermediate images to be generated. Each intermediate image is generated in that for each pixel of this intermediate image, the raw overview image is searched out which has the brightness rank at the corresponding pixel which is to be assigned to the respective intermediate image. The brightness value of the corresponding pixel of the found raw overview image is then used for the intermediate image pixel. During the combination to form the overview contrast image, the intermediate image which has the highest brightness rank is not taken into consideration and is not incorporated into the overview contrast image. The combination of the intermediate images to form the overview contrast image is carried out, for example, by averaging, or also other procedures of image processing are possible. In the device, the processing unit is configured so that it executes this step.

The first intermediate image (in the highest brightness rank) contains in some embodiments the images of all single light sources which are to be seen as overmodulated regions in the image and therefore conceal items of image information. For this reason, the first intermediate image is not taken into consideration during the combination of the intermediate images to form the overview contrast image. Its pixels would only be an overmodulated region which possibly conceals items of image information. Therefore, by leaving out the intermediate image assigned to the first brightness rank, overmodulated pixels are not taken into consideration in the overview contrast image.

The term "rank" implies a sequence with respect to the brightness, therefore a sorting. The absolute brightness is not relevant here. The intermediate image assigned to the first brightness rank has in each pixel the brightness value of the brightest pixel which is to be found at the corresponding point among all raw overview images. This applies similarly to the further brightness ranks, which contain darker and darker pixels decreasing from rank to rank.

The number of the intermediate images preferably corresponds to the number of the brightness ranks. For example, if one defines 12 brightness ranks, 12 intermediate images are generated. Eleven of them are combined to form the overview contrast image, since the intermediate image of the highest brightness rank does not participate. Generating the intermediate images from the N raw overview images is the greatest computing effort. The computing effort scales with the number M of intermediate images. For example, if M=6 is selected as the number, the computing effort and the time expenditure for calculating the intermediate images linked thereto is less than in the case of M=12.

The first intermediate image contains all pixels in the highest brightness rank, it thus generally corresponds at each pixel to a maximum projection over all N raw overview images. The intermediate image which is assigned to the second brightness rank has at each pixel the brightness value of the pixel which is second brightest among all raw overview images at this point in the image. This can also be achieved by a correspondingly set maximum projection. This applies similarly to the further intermediate images/brightness ranks.

The visibility and the recognizability of the sample are improved by these measures, since the structures which are to be associated with the sample are brought out in the overview contrast image. Parts of the sample carrier and the sample located thereon which are relevant for further examinations are imaged so they are well visible by the method and the device for generating the overview contrast image of the sample in the microscope. An interaction with the sample and a navigation on the sample are thus significantly facilitated for the user. Moreover, an automated evaluation of the sample is implemented in that the sample and the sample carrier type can be automatically recognized by the processing unit, whereby it can independently set certain recording parameters on the microscope. The user-friendliness is thus significantly increased and improved automation of the microscopic examination is opened up. Furthermore, automatic locating of the sample in the overview image enables the microscope objective to be positioned without action of the users so that the sample is located in the recording region of the microscope. This procedure drastically reduces the time which the user requires until recording a first image.

The generation of the intermediate images preferably begins as soon at least two raw overview images are recorded. The intermediate images are then updated progressively when further raw overview images are added thereto. The time expenditure during the microscopic examination is thus further reduced. The procedure can also be continued progressively, i.e., the intermediate images and also the overview contrast image are continuously updated. This is advantageous in the case of changing samples.

In some embodiments, the intermediate images are brightness scaled before the combination to form the overview contrast image, in that the scope for the brightness which the pixels have due to the respective brightness rank of each intermediate image is converted to a greater brightness rank, which is preferably the same for all intermediate images. This is preferably carried out by means of a min-max scaling, a percentile scaling, or a histogram equalization. The brightness scaling causes all intermediate images to have essentially the same brightness or the same brightness scope, although they were originally in different brightness ranks, thus had different brightnesses before the brightness scaling. The type and parameters of the brightness scaling determine how brightly structures are to be recognized in the respective intermediate image. For example, if a 10%/90% percentile scaling is carried out, structures are brighter than in the case of a 2%/98% percentile scaling. In the device, this brightness scaling is executed by the processing unit. Since the computing effort is largely in generating the intermediate images, brightness scaling can also be carried out multiple times using multiple settings.

In modifications, two overview contrast images are generated. A first overview contrast image is generated from the intermediate images without brightness scaling. This first overview contrast image is particularly well suitable for displaying very bright structures in the intermediate image, for example glass edges. A second overview contrast image is generated from the intermediate images having preceding brightness scaling of the intermediate images. It is better suitable for darker structures in the intermediate images. Preferably, the first and the second overview contrast image are combined in order to obtain an improved overview contrast image which displays very bright and very dark regions similarly well.

The overview contrast image is preferably postprocessed. For example, a white balance is typical. Results and intermediate results are preferably displayed to the user on an imaging device.

Figure 2:
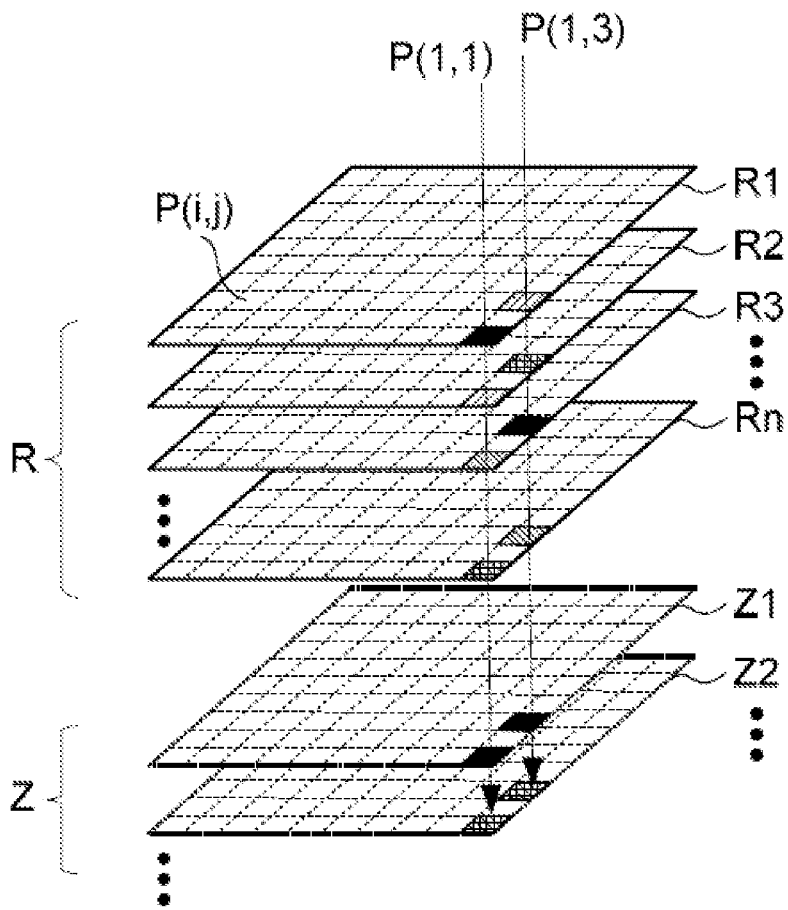
Figure 3:
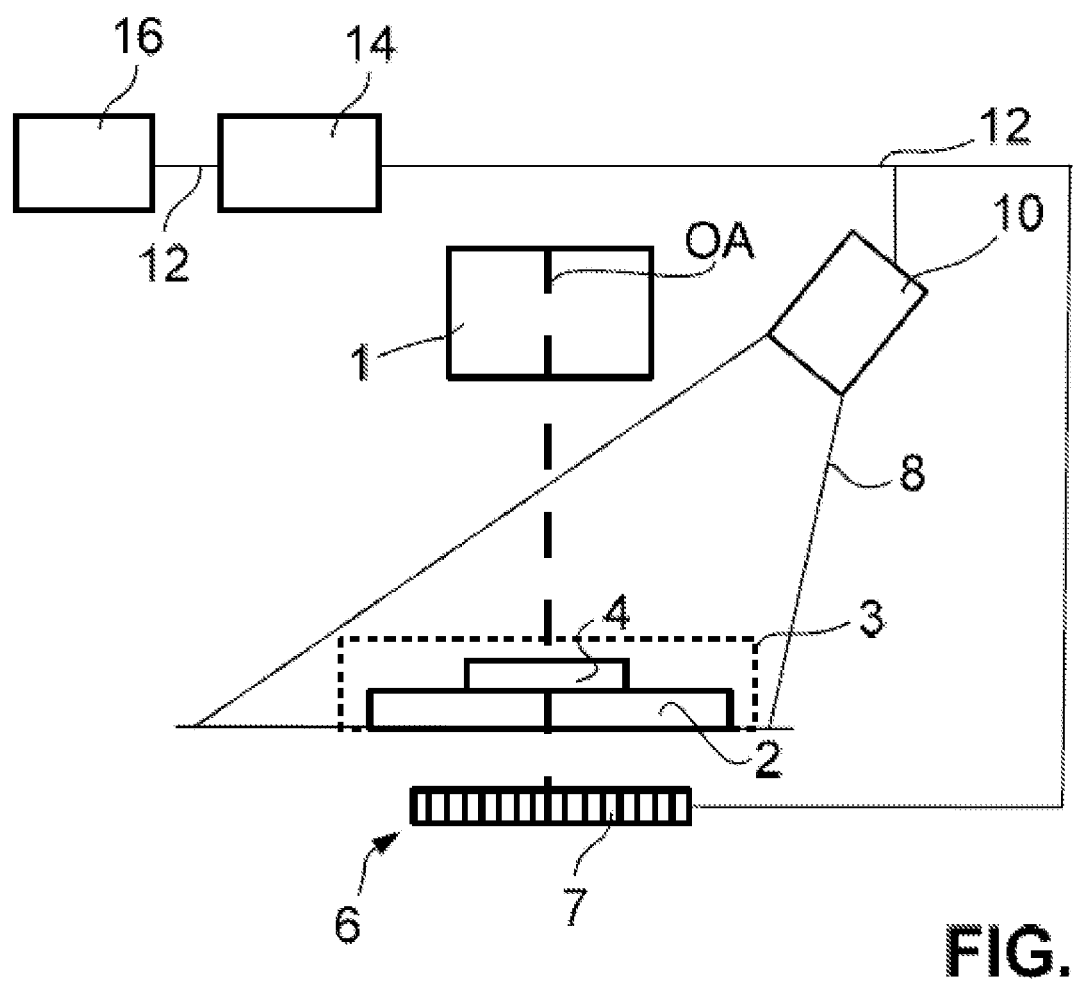

The invention is explained in more detail by way of example hereinafter with reference to the drawings. In the figures:

FIG. 1 shows a flow chart of the method for generating an overview contrast image of a sample carrier in a microscope, FIG. 2 shows a schematic illustration of the generation of an intermediate image, and FIG. 3 shows a device for generating an overview contrast image of a sample carrier in a microscope.

FIG. 1 shows a flow chart of a method for generating an overview contrast image, which is executed using the microscope 1 shown in FIG. 3. A sample volume 3, in which a sample carrier 2 with sample 4 is arrangeable, is imaged in this case. In a first step S1, the sample carrier 2 is illuminated in transmitted light from a two-dimensional illumination array 6, which has individually switchable single light sources 7. For example, an LED array having single LEDs is used as the two-dimensional illumination array 6. The single light sources 7 are switched through individually, so that multiple different illumination states are obtained.

In a second step S2, a raw overview image R of the sample volume 3, i.e., in the exemplary embodiment according to FIG. 1 of the sample carrier 2 with sample 4, is recorded for each illumination state. Raw overview images R1 to Rn are thus generated, in that precisely one of the single light sources 7 is switched on for the image recording. For each raw overview image R1 to Rn, one single light source 7 is thus switched on, so that N raw overview images R1 to Rn are recorded. For each raw overview image R1 to Rn, a different single light source lights up. All raw overview images R1 to Rn are recorded using the same camera. The position of this camera remains the same for the recording of all raw overview images R1 to Rn. Preferably, N corresponds to the number of the single light sources 7. However, not all available single light sources have to be used. The switching through of the single light sources 7 can take place in series (thus from the first to the Nth single light source 7) or in any other sequence.

In addition to structures of the sample 4, structures which are not to be associated with the sample 4 and which would make it more difficult to find the sample 4 are also located in the raw overview images R1 to Rn. These structures which are not to be associated with the sample 4 are, for example, elements of the image recording process, such as the single light sources 7.

To suppress this interference, in a third step S3, intermediate images Z are generated, which are then combined in a step S4 to form an overview contrast image.

The intermediate images Z suppress the interference. To generate the intermediate images Z, in step S3, first brightness ranks are defined in a specific number. They apply for the brightness of the pixels P(i, j) of the raw overview images R1 to Rn. There are thus brightest pixels P(i, j), second brightest pixels P(i, j), etc. The term "brightness rank" thus expresses a ranking according to brightness, but not absolute brightness values. Each of the intermediate images Z to be generated is assigned to precisely one brightness rank.

Each intermediate image Z is then generated in that for each pixel P(i, j) of this intermediate image, the pixel P(i, j) is searched out in the raw overview images R1 to Rn which has the brightness rank which is assigned to the respective intermediate image Z. The brightness value of the pixel found is used and employed for the pixel P(i, j) of this intermediate image Z. This procedure is visualized in FIG. 2.

FIG. 2 shows a schematic illustration of the generation of the intermediate images Z from the raw overview images R1 to Rn. The individual raw overview images R1 to Rn are shown, which are each composed of pixels P(i, j). A pixel P(i, j) characterizes a location in the image in a raster graphic and a pixel value, namely a brightness value, is assigned to it, which the image has at this location. For the intermediate image Z1, which is assigned to the first brightness rank, for each pixel P(i, j), among all raw overview images R1 to Rn, the respective raw overview image R1 to Rn is searched out that has the pixel P(i, j) having the first brightness rank, i.e., the pixel P(i, j) having the greatest pixel value there, and its brightness value is assumed for the pixel P(i, j) of the intermediate image Z1. In FIG. 2, the brightness is coded by the shading/blackness of the pixel P(i, j). For example, if one takes the pixel P(1, 1), i.e., the pixel in line 1, column 1, the brightness value of the brightest pixel P(1, 1) which is to be found among all raw overview images R1 to Rn at P(1, 1) is thus used there for the intermediate image Z1. In the illustrated example, it would be the pixel P(1, 1) of the raw overview image R1. For the pixel P(1, 3), for example, it would be the pixel P(1, 3) from R3.

An analogous procedure is used for the intermediate image Z2, which is assigned to the second brightness rank. For this purpose, for P(1, 1), among all raw overview images R1 to Rn, the one is searched out which has the second brightest among all pixels P(1, 1) at P(1, 1), thus the pixel P(1, 1) of the second brightness rank. In FIG. 2, at P(1, 1), it is the pixel P(1, 1) from Rn, at P(1, 3), the corresponding pixel P(1, 3) from R2.

The same procedure is then used for all other intermediate images Z. As a result, each intermediate image Z exclusively has pixels P(i, j) which correspond to its brightness rank.

In a fourth step S4, the intermediate images Z are subsequently combined to form the overview contrast image, wherein the intermediate image Z1 having the first brightness rank is not taken into consideration and is not incorporated into the overview contrast image. Overmodulation effects are suppressed in this way, since the brightest pixels P(i, j), thus those in the highest brightness rank, which would be perceived as overmodulated regions, are not accepted and thus do not conceal image contents of the overview contrast image. The pixels P(i, j) which are not taken into consideration in the overview contrast image correspond in some embodiments to images of the single light sources 7 which were each switched on to record the raw overview images R1 to Rn.

Furthermore, the visibility and the recognizability of the sample 4 is improved, since the structures which are to be associated with the sample 4 are brought out in the overview contrast image by a contrast to surroundings of the sample 4.

In the device, the processing unit 14 is configured so that it executes this step.

The combination of the intermediate images Z to form the overview contrast image is carried out, for example, by averaging, but also other procedures of image processing are possible, for example a min projection, a max projection, or a median projection.

The generation of the intermediate images Z preferably begins as soon at least two raw overview images R are recorded. The intermediate images are then progressively updated when further raw overview images R are added thereto. The time expenditure is thus reduced.

The intermediate images Z are optionally brightness scaled after they are generated, in that the scope for the brightness which its pixels P(i, j) have is preferably converted to a greater brightness scope, which is preferably the same for all intermediate images Z. In this case, for example, a brightness scope containing a brightness value range of 55% to 60% is "expanded", for example, to a brightness scope of 0% to 100%. This is preferably carried out by means of a min-max scaling, a percentile scaling, or a histogram equalization. This achieves the above-described brightness equalization among the intermediate images Z.

The overview contrast image is preferably further post-processed. For example, a white balance is typical.

The device for generating an overview contrast image of a sample carrier 2 in a microscope 1 is shown in FIG. 3. Along an optical axis OA, the microscope 1 acquires a sample volume 3, in which a sample 4 located on a sample carrier 2 is arranged, using an objective (not shown separately). The sample volume 3 and thus the sample 4 is illuminated in transmitted light by a two-dimensional illumination source 6 having single light sources 7. An image field 8 of a camera 10 is oriented on the sample volume 3 and thus the sample carrier 2. The illumination source 6 and the camera 10 are connected to the processing unit 14, either via electrical lines 12, as shown in FIG. 2, or via radio or the like. The processing unit 14 is in turn connected via electrical lines 12, radio, or the like to a display device 16.

The camera 10 acquires in its image field 8 the sample volume 3 and the sample 4 located therein on the sample carrier 2. The processing unit 14 activates the camera 10 and reads it out to record various raw overview images R1 to Rn of the sample volume 3. The processing unit 14 also activates the two-dimensional illumination array 6, which has individually switchable single light sources 7 and illuminates the sample volume 3 in transmitted light, in order to switch on the single light sources 7 individually. An LED array having single LEDs, which are switched through by the processing unit 14 in series or according to any sequence, is used as the two-dimensional illumination source 6, for example. The position and the orientation of the camera 10 remain the same at all times during the recording of the raw overview images R1 to Rn.

The processing unit comprises, for example, a processor and a RAM and is configured so that it generates each of the raw overview images R1 to Rn in that it switches on precisely one of the single light sources 7, wherein it switches on an individual single light source for each raw overview image R1 to Rn, so that it digitally records N raw overview images. It generates and processes the raw overview images R1 to Rn according to the method explained by means of the flow chart from FIG. 1. It preferably displays the results and/or intermediate results to the user on the display device 16, which has, for example, a monitor or a display.

LIST OF REFERENCE SIGNS 1 microscope
2 sample carrier
3 sample volume
4 sample
6 illumination array
7 single light source
8 image field
10 camera
12 electrical lines
14 processing unit
16 display device
OA optical axis
S1-S4 step
Z intermediate image
P(i, j) pixel (line i, column j)
P(1, 1) pixel (line 1, column 1)
R1-Rn raw overview image

The invention claimed is:

1. A method for generating an overview contrast image of a sample carrier in a microscope, which images a sample arranged on the sample carrier, in which
   a) the sample carrier is illuminated in transmitted light from a two-dimensional illumination array, which has individually switchable single light sources,
   b) multiple different raw overview images of the sample carrier are recorded,
   wherein:
   each of the raw overview images is generated in that precisely one of the single light sources is switched on, wherein an individual one of the single light sources is switched on for each raw overview image, so that N raw overview images are recorded,
   c) intermediate images are generated from the raw overview images, in that
      c1) brightness ranks are defined for pixels of the raw overview images,
      c2) each intermediate image is assigned to precisely one brightness rank, and
      c3) in each intermediate image, for each pixel of this intermediate image, the raw overview image is searched out in the raw overview images which has the brightness rank at the corresponding pixel which is assigned to the respective intermediate image, and the brightness value of the corresponding pixel of the found raw overview image is used, and
   d) the intermediate images are combined to form the overview contrast image, wherein the intermediate image assigned to the first brightness rank is not taken into consideration and is not incorporated into the overview contrast image.

2. The method as claimed in claim 1, wherein the search in substep c3) comprises a min/max projection.

3. The method as claimed in claim 1, wherein the generation of the intermediate images begins as soon as at least two raw overview images are recorded and the intermediate images are progressively updated when further raw overview images are added.

4. The method as claimed in claim 1, wherein in step d) after the generation of the intermediate images, the intermediate images are brightness scaled after they are generated, in that the scope for the brightness which the pixels have due to the respective brightness rank of each intermediate image is converted to a greater brightness scope, which is preferably the same for all intermediate images.

5. The method as claimed in claim 4, wherein the brightness scaling of the intermediate images is carried out by means of a min-max scaling, a percentile scaling, or a histogram equalization.

6. The method as claimed in claim 1, wherein the overview contrast image is postprocessed by methods of image processing.

7. The method as claimed in claim 1, wherein in step d), the intermediate images are combined using averaging, a min projection, a max projection, and/or a median projection to form the overview contrast image.

8. A device for generating an overview contrast image of a sample carrier to be arranged in a sample volume in a microscope, having
   a camera, which has an image field acquiring the sample volume,
   a two-dimensional illumination array, which has individually switchable single light sources and illuminates the sample volume in transmitted light, and
   a processing unit, which activates and reads out the camera in order to record multiple different raw overview images of the sample volume,
   wherein:
   the processing unit activates the two-dimensional illumination array in order to switch on the single light sources individually,
   the processing unit is configured so that it generates each of the raw overview images, in that it switches on precisely one of the single light sources, wherein it switches on an individual one of the single light sources for each raw overview image so that it records N raw overview images,
   the processing unit is configured so that it generates intermediate images from the raw overview images in that it defines brightness ranks for pixels of the raw overview images, assigns each intermediate image to precisely one brightness rank, and in each intermediate image, for each pixel of this intermediate image, searches out the raw overview image in the raw overview images which has the brightness rank at the corresponding pixel which is assigned to the respective intermediate image, and uses the brightness value of the corresponding pixel of the found raw overview image, and
   the processing unit is configured so that it combines the intermediate images to form the overview contrast image, wherein it does not take the intermediate image assigned to the first brightness rank into consideration and does not incorporate it into the overview contrast image.

9. The device as claimed in claim 8, wherein the processing unit is configured so that it applies a min/max projection during the search of the pixels in the raw overview images.

10. The device as claimed in claim 8, wherein the processing unit is configured so that it begins with the generation of the intermediate images as soon as at least two raw overview images are recorded and progressively updates the intermediate images when further raw overview images are added.

11. The device as claimed in claim 8, wherein the processing unit is configured so that after the intermediate images are generated, the intermediate images are brightness scaled in that it converts the scope for the brightness which the pixels have due to the respective brightness rank of each intermediate image to a greater brightness scope, which is preferably the same for all intermediate images.

12. The device as claimed in claim 11, wherein the processing unit is configured so that it brightness scales the intermediate images by means of a min-max scaling, a percentile scaling, or a histogram equalization.

13. The device as claimed in claim 8, wherein the overview contrast image is postprocessed using methods of image processing.

14. The device as claimed in claim 8, wherein the processing unit is configured so that it combines the intermediate images using averaging, a min projection, a max projection, and/or a median projection to form the overview contrast image.

\* \* \* \* \*